United States Patent [19]

Comolli et al.

[11] Patent Number: 5,037,791

[45] Date of Patent: Aug. 6, 1991

[54] POROUS METAL OXIDE SUPPORTED CARBON-COATED CATALYSTS AND METHOD FOR PRODUCING SAME

[75] Inventors: Alfred G. Comolli, Yardley, Pa.; Partha S. Ganguli, Princeton, N.J.

[73] Assignee: HRI, Inc., Princeton, N.J.

[21] Appl. No.: 541,553

[22] Filed: Jun. 21, 1990

Related U.S. Application Data

[63] Continuation-in-part of Ser. No. 226,929, Jul. 28, 1988, abandoned.

[51] Int. Cl.$^5$ .................... B01J 21/18; B01J 23/24; B01J 23/88
[52] U.S. Cl. .................... 502/185; 208/217; 208/251 H; 502/180; 502/182; 502/413; 502/415; 502/433
[58] Field of Search .................... 502/182–185, 502/62, 180, 407, 413, 415, 423

[56] References Cited

U.S. PATENT DOCUMENTS

| | | | |
|---|---|---|---|
| 3,446,865 | 5/1969 | Roth et al. | 592/183 |
| 3,793,224 | 2/1974 | Cooper | 502/185 |
| 3,859,421 | 1/1975 | Hucke | 423/445 |
| 3,978,000 | 8/1976 | Schmitt, Jr. et al. | 502/185 |
| 4,031,292 | 6/1977 | Hervert | 502/185 |
| 4,054,687 | 10/1977 | Kunz | 502/185 |
| 4,206,078 | 6/1980 | Ohorodnik et al. | 502/180 |
| 4,454,240 | 6/1984 | Ganguli | 502/26 |
| 4,595,666 | 6/1986 | Ganguli | 502/26 |

FOREIGN PATENT DOCUMENTS

| | | | |
|---|---|---|---|
| 8600646 | 10/1987 | Netherlands | 502/182 |
| 1204353 | 9/1970 | United Kingdom | 502/415 |

*Primary Examiner*—Paul E. Konopka
*Attorney, Agent, or Firm*—Fred A. Wilson

[57] ABSTRACT

Supported carbon-coated catalyst material and a method for producing and using same in catalytic reaction processes, preferably in ebullated or fluidized catalyst beds. The catalyst materials are prepared by depositing a porous carbon layer on a support material of a selected metal oxide or compound to produce 5–40 wt. % carbon thereon, then preferentially treating the carbon based layer by partial oxidation, pyrolysis or reduction to enhance and activate the carbon layer on the catalyst. Promoter materials can also be advantageously added either to the support material or to the carbon layer in 0.5–10 wt. % to provide an improved composite carbon-coated catalyst having total pore volume of 0.3–1.0 cc/gm, substantially increased surface area of 80–600 M$^2$/gm, low surface acidity, particle strength of 1.8–5 lb/mm with reduced particle attrition losses and improved catalyst performance characteristics.

19 Claims, 4 Drawing Sheets

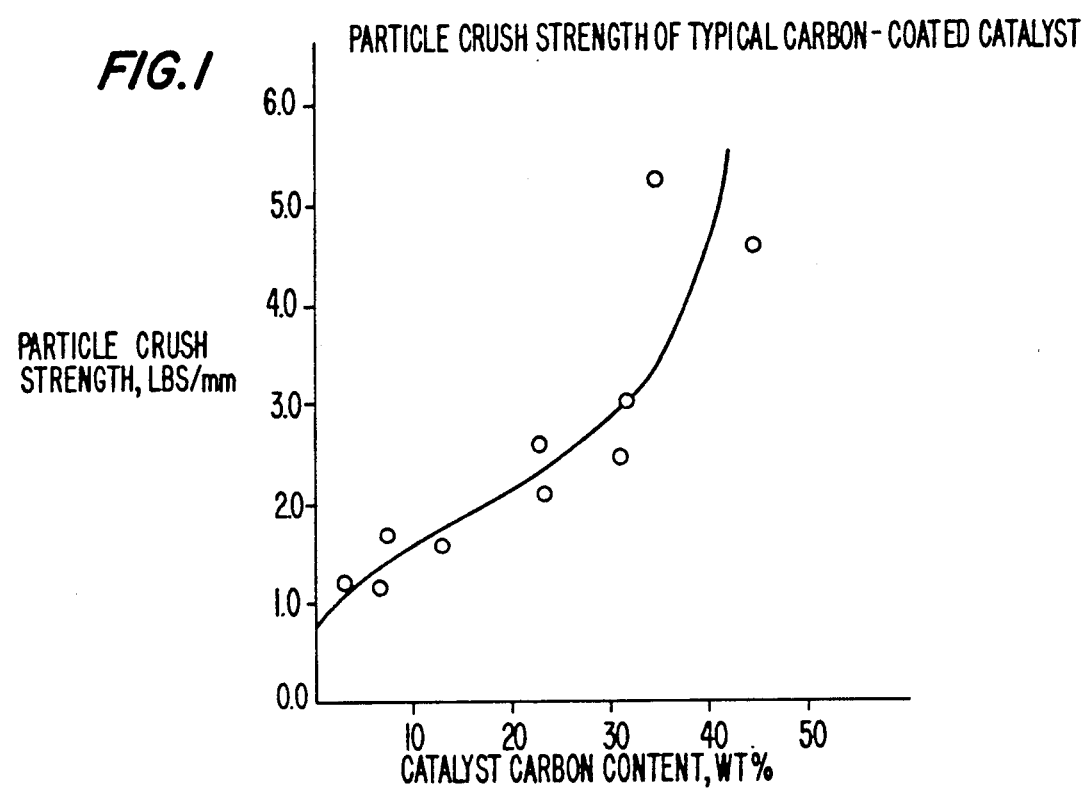
FIG.1 PARTICLE CRUSH STRENGTH OF TYPICAL CARBON-COATED CATALYST
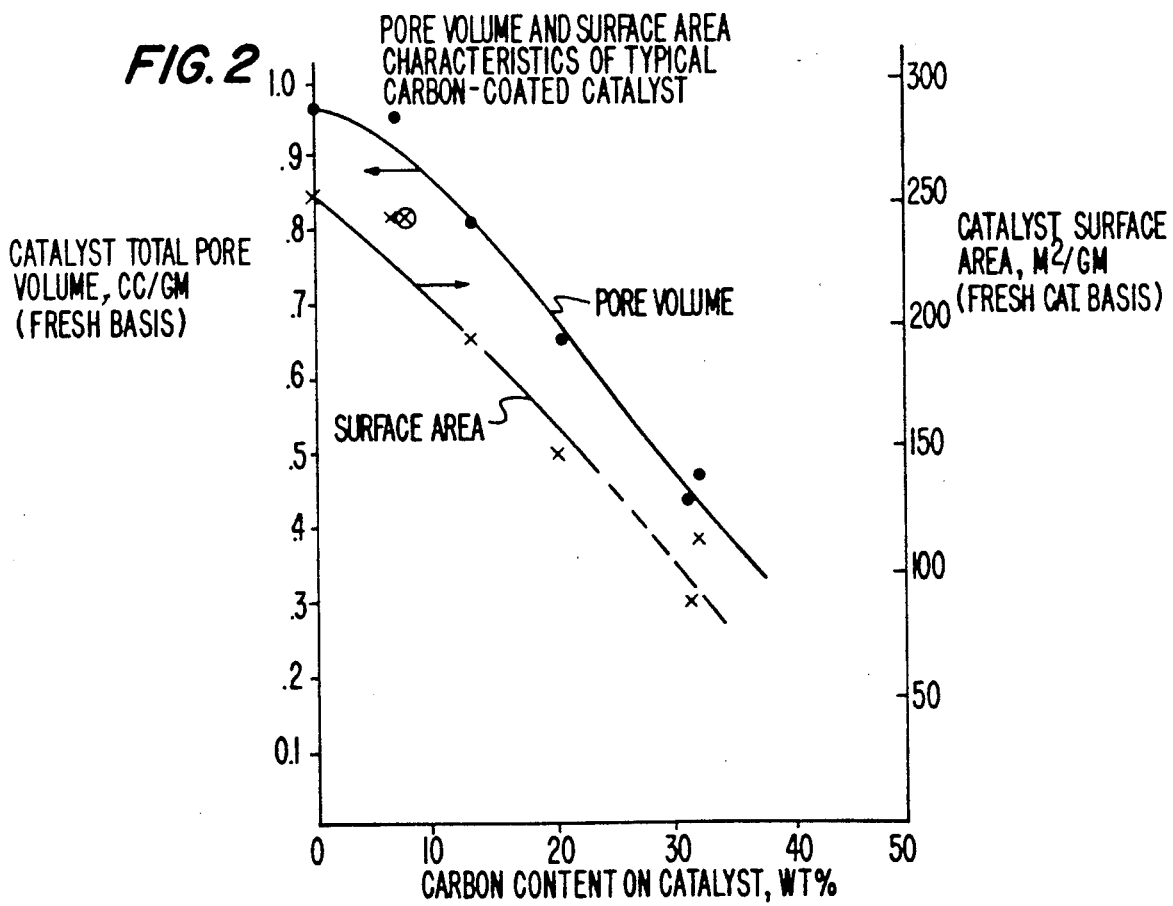
FIG.2 PORE VOLUME AND SURFACE AREA CHARACTERISTICS OF TYPICAL CARBON-COATED CATALYST

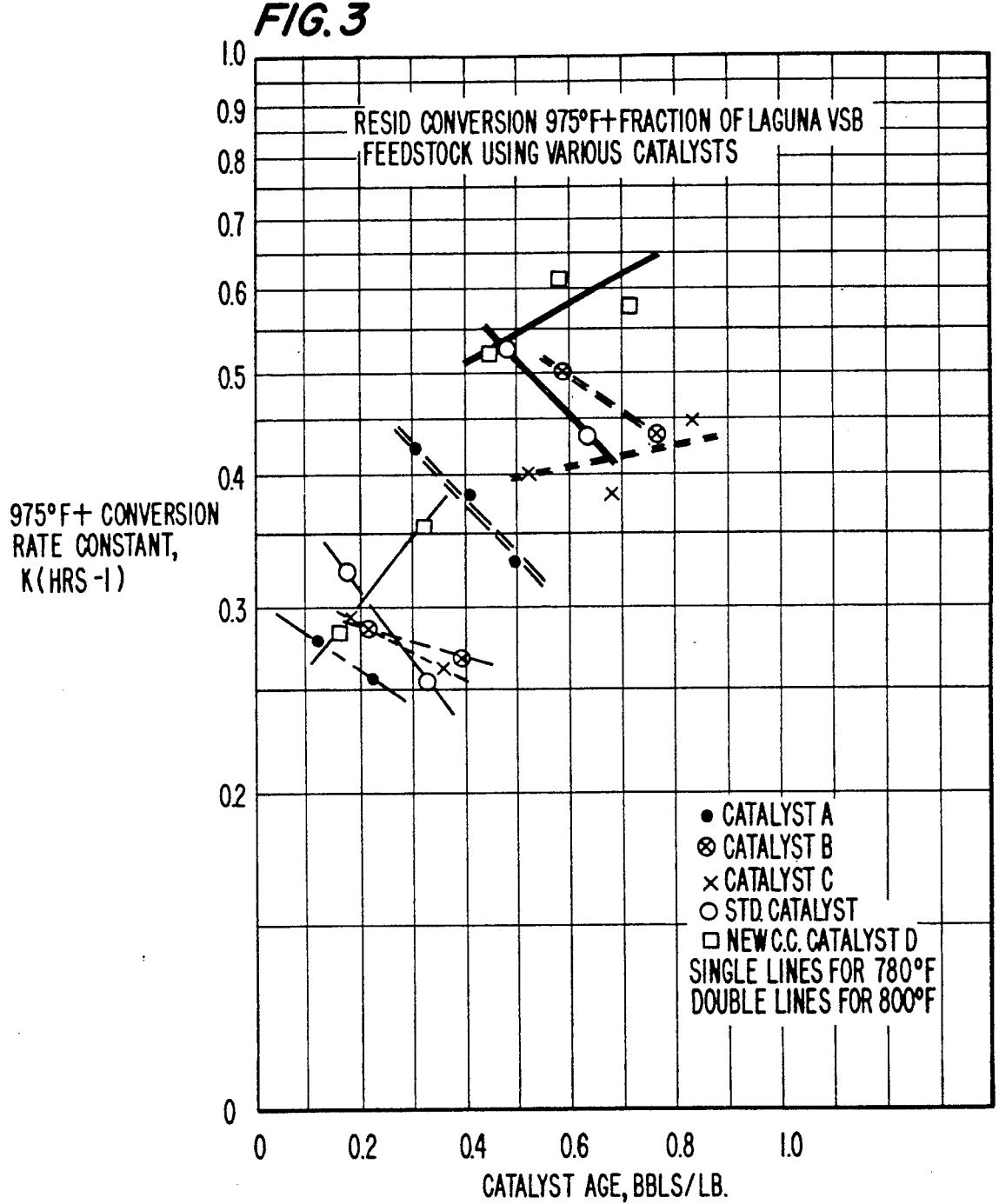

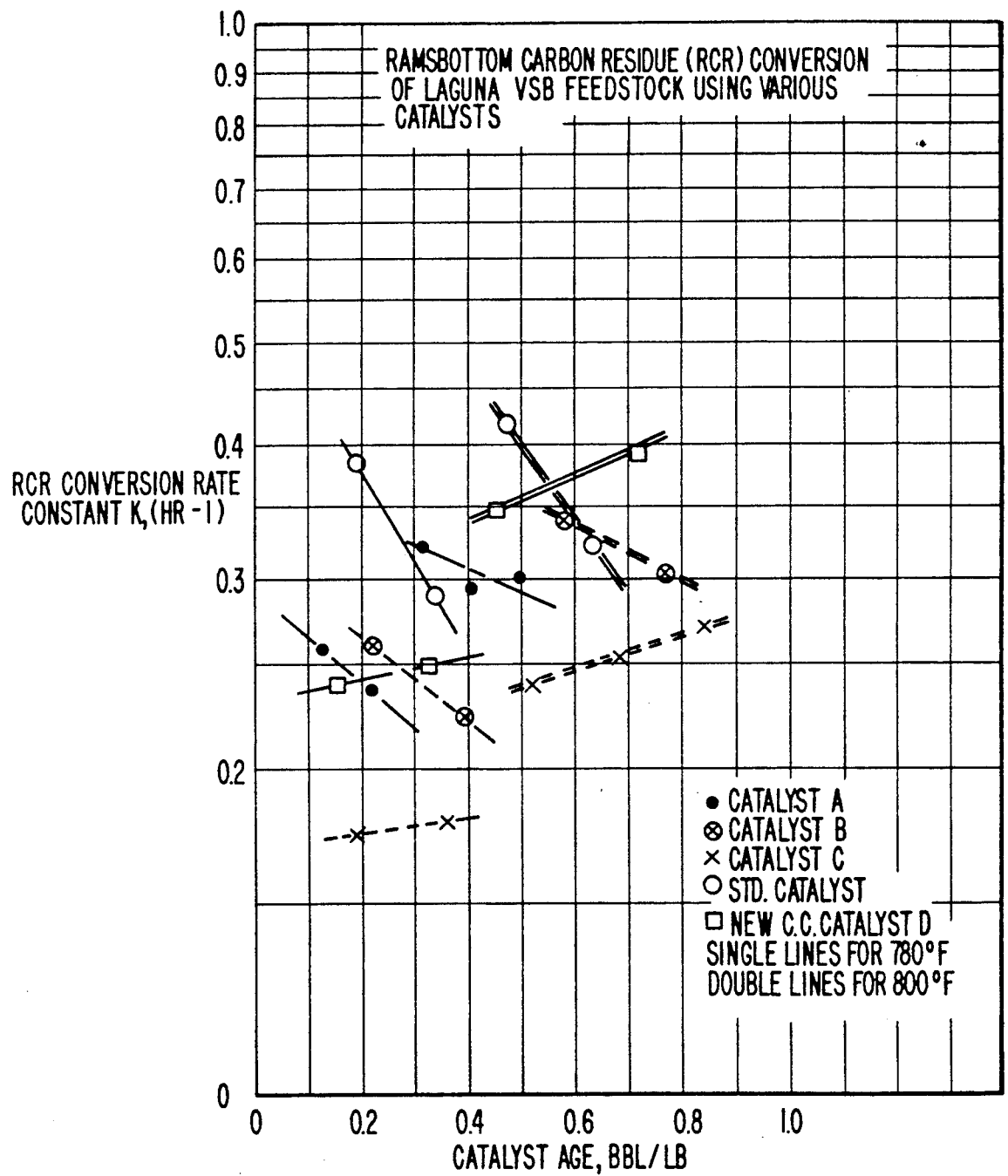

POROUS METAL OXIDE SUPPORTED CARBON-COATED CATALYSTS AND METHOD FOR PRODUCING SAME

This application is a continuation-in-part of application Ser. No. 226,929, filed July 28, 1988 and now abandoned.

BACKGROUND OF INVENTION

This invention pertains to porous metal oxide supported carbon-coated catalysts which have improved porosity, surface area, and particle strength. It also pertains to methods for producing such supported carbon-coated catalysts and their use in catalytic reaction processes principally in ebullated bed reactors.

Carbon based catalysts are generally known, for example, U.S. Pat. No. 3,793,224 to Cooper, U.S. Pat. No. 3,859,421 to Hucke and U.S. Pat. No. 3,978,000 to Schmidt, et al disclose methods for producing carbon based catalysts in which the support material used is primarily carbon. Activated carbon-substrate catalysts are known to have high activity and high surface area, but also have low density, low strength, and high attrition of the catalyst particles. One of the major difficulties in the use of such carbon-based catalysts in reactors containing fluidized and ebullated type catalyst beds is the relatively low density and low cohesiveness of such catalysts. This makes it difficult to retain the catalyst particles in a fluidized or ebullated bed in a reactor, and to prevent undesired catalyst attrition and carryover from the reactor to downstream process equipment. Also, the particle strength and attrition resistance of such carbon based catalysts is undesirably low, leading to costly high losses of catalyst due to attrition of the particles during such catalytic processing operations on hydrocarbon feedstocks.

It is known that activity of gamma-alumina substrate catalyst increases with increase in its pore volume and surface area. However, due to the low particle strength and low attrition resistance of such high pore volume catalysts, there is a practical limitation on maximum pore volume and surface area attainable for such catalysts. In our development work with catalyst leading to the present invention, it was noticed that carbon coatings on various catalysts results in a significant increase in catalyst strength and attrition resistance characteristics. Also, initial carbon coating tends to inhibit additional deposition of carbon on the catalyst, and consequently results in less deactivation of the catalyst during hydrocarbon processing operations. Thus, the catalyst maximum pore size for supported carbon-coated catalysts can be larger and the catalyst more effective in hydroconverting macromolecules having more than two rings.

It was found in our studies of spent catalyst regeneration, that spent catalyst having 10–20 W % carbon laydown and metals deposits can be treated with dilute acid solutions to substantially remove the metal deposits, after which the treated used catalyst will then perform generally about as well as a fresh catalyst at similar operating conditions, as was disclosed in U.S. Pat. Nos. 4,454,240 and 4,595,666 to Ganguli. It appears that the acid treatment removes the metallic constituents which are deposited on the catalyst along with the carbon, and thereby opens the pores located within the carbon and substrate matrix. Thus, the used catalyst treated to remove metal deposits has performance which is substantially equal to that of fresh catalyst. Although U.S. Pat. No. 3,446,865 to Roth et al has disclosed a supported carbon-coated catalyst, it does not provide adequate pore volume and surface area characteristics needed for many operations, such as catalytic hydrogenation of heavy hydrocarbon feedstocks.

It has now been unexpectedly found that by using separate controlled catalyst treatment procedures, improved fresh composite metal oxide supported carbon-coated catalysts can be produced having improved porosity, particle strength and catalytic activity. This supported carbon-coated catalyst structure permits successful use of such improved carbon-coated catalysts in fluidized and ebullated bed process applications with minimal attrition of the catalyst particles. Also, catalysts which are intended for use in process applications in which carbon laydown on the catalyst is not a normal process occurrence, such as in liquid phase methanation and other Fischer-Tropsch reactions and in the oxidation of organic vapors, can be advantageously strengthened and improved in catalytic activity and useful life using this carbon-coating catalyst production method.

SUMMARY OF INVENTION

The present invention provides particular supported carbon-coated catalyst materials which are supported on metals or metal oxides and have superior strength and improved pore volume, surface area and performance characteristics. In general, these catalysts are prepared by providing a carbon-containing layer on selected metal oxide inorganic support materials, then preferentially treating the carbon layer such as by selected pyrolysis and/or partial oxidation steps so as to increase its porosity and activate the pore structure of the catalyst carbon layer. Metal promoter materials can be added to the carbon layer, or alternatively such promoters can be added to the inorganic support material, so as to provide a composite carbon-coated catalyst material having improved particle strength and performance characteristics.

Deposition of the porous carbon coating or layer and the type of carbon structure obtained on the catalyst support or substrate material is controlled by proper selection of the carbon precursor material or hydrocarbon feedstocks used, and by the reaction and treatment conditions used for such carbon layer. Activated carbons, carbon black composites, and mesapore carbons may be used as the porous carbon coatings or layer. The carbon layer may have a filament or granular type structure providing high porosity, access volume and surface area. Other less desirable carbon coating forms that may be formulated to obtain a desired pore structure are polymeric metal carbide and graphite types. Porosity may also be provided in the carbon layer by the addition of fugitive vaporizable organic compounds and by control of the crystallinity of the carbon surface. Selective organic compounds such as glycerols can be added to the catalyst substrate material and vaporized to provide additional pore volume for the catalyst. Passing a hydrocarbon-containing material through a fluidized or ebullated catalyst bed is an excellent means and procedure for providing a uniform carbon coating or layer on various particulate catalyst substrate materials.

According to the present invention, a support material having relatively high pore volume and high surface area is provided and coated with a porous carbon layer deposited thereon. At least one active promoter metal or compound such as cobalt, chromium, iron, molybdenum, nickel, titanium or tungsten and mixtures thereof is added either onto the metal support surface, or added onto or within the carbon layer surface deposited on the support. Such promoter metals or compounds should be 0.5-10 wt. percent of the composite catalyst. A highly active, low acidity, high-strength, low deactivating carbon-coated catalyst material is thereby produced, which advantageously combines the high surface area and high activity characteristic of an activated-carbon-supported catalyst, with the high strength, high density characteristics of a metal oxide substrate catalyst. The resulting supported composite carbon-coated catalyst material has the following broad and preferred ranges of physical characteristics:

|  | BROAD | PREFERRED |
|---|---|---|
| Catalyst Carbon Content, W % | 5-40 | 10-30 |
| Pore Volume, cc/gm | 0.3-1.0 | 0.4-0.9 |
| Pore Size Diameter Range, Angstroms | 50-5000 | 100-4000 |
| Surface Area, $M^2$/gm | 80-600 | 100-500 |
| Attrition Loss, W %[1] | 3.5 max | 2-3 |
| Particle Crush Strength, lb/mm[2] | 1.5-5.0 | 1.8-3.5 |

[1] Based on catalyst particle attrition and abrasion test per ASTM No. D4058-81, by barrel tumbling at 40 rpm for 7 hours.
[2] Catalyst crush strength per unit length based on ASTM Test No. D4179-82, for nominal 1/32 in. dia. extrudates.

The concept of an improved carbon-coated catalyst material is based on our observation that deactivated carbon-laden catalysts are structurally stronger than the fresh catalysts, and that this carbon coating is the catalyst condition produced during many desirable hydrocarbon processing operations. Metal oxide support or substrate materials can be carbon coated at some selected reaction conditions, such as in hydrocracking reactions of heavy hydrocarbons in which the catalysts can be deposited with a carbonaceous matter during the reactions, and by coating the substrate by pyrolizing it with a gaseous or liquid carbon precursor material. The carbon coating provided on the support should be in a strength producing or strength enhancing form having a connecting network of carbon particles which increase pore size, pore volume, surface area and improve particle strength, such as filamentary, granular and polymeric carbon forms or their equivalent which are hard and resistant to inter particle abrasion.

The catalyst desired pore size distribution and pore volume can be controlled by selection of the base support material, by the carbon precursor materials, used, i.e. aromatic or polymeric materials, by metal and fugitive organic additives, and by the conditions of carbon lay down followed by treatment and fixation, i.e. by pyrolysis and partial oxidation steps, the combinations being numerous. Such carbon layer treatment steps increase the pore size and volume, by not only increasing the size of existing pores but also by forming new pores. The preferred carbon layer treatment step is partial oxidation using 0.5-6 vol % oxygen in an inert atmospheric gas at 650°-850° F. temperature for 1-300 minutes, depending upon the pore volume desired. Partial oxidation treatment using either increased oxygen concentration, increased temperature and/or time produces increased pore volume for the carbon layer. The metal compound promoters may be added during carbon laydown, after carbon fixation, or in the substrate or within the substrate material. This carbon-coated catalyst and its production method provides high strength, highly active catalysts for use in fluidized bed catalytic process applications in which carbon deposition on the catalyst may or may not be inherent with the reactions.

Advantages of this metal oxide supported carbon-coated catalyst include providing catalyst particles having high crush strength and attrition resistance, high surface area and oil penetration, and the ability to produce catalysts having a high proportion of large size pores (>150A) while retaining adequate particle strength for process applications in which fluidized beds are used for hydrotreating heavy oils, such as the ebullated catalyst bed or three-phase fluidized bed. The invention can also be applied to carbon coated catalysts as micropores, such as used for $CO+H_2$ hydrocracking or hydrotreating reactions for liquid phase methanol synthesis processes, while retaining high strength and attrition resistance for the catalyst.

The production of such supported carbon-coated catalyst allows the use of the high surface area characteristic of activated carbon, for which catalyst surface areas >200 $M^2$/gram are commmonplace. It also provides for use of a less acidic surface than provided by aluminum oxide or silicon oxide substrates, thus promoting hydrogenation reactions, and provides more resistance to additional carbon lay-down and catalyst poisoning during high temperature processing. These higher strength carbon-coated catalyst extrudates or spheres are also useful in adsorption applications for removal of color bodies and other contaminants from waste water, chemical and off-gas streams.

The carbon-coated catalyst of this invention may be advantageously used in processes for catalytic hydroconversion of hydrocarbon feed materials, such as coal and petroleum feedstocks, using ebullated or fluidized bed reactors at elevated temperature and pressure conditions to produce hydrocarbon liquid fuel products. In the process, the feed material is introduced along with hydrogen into the catalytic reaction zone, which is maintained at conditions of 700°-850° F. temperature, and 1000-3000 psig hydrogen partial pressure, and having superficial upward liquid velocity of 0.1-1.0 ft/sec.

BRIEF DESCRIPTION OF DRAWINGS

This invention will be further described with reference to the following drawings, in which:

FIG. 1 is a graph showing catalyst particle crush strength plotted vs. carbon content for a typical carbon-coated catalyst produced according to the invention;

FIG. 2 is a graph showing catalyst total pore volume and surface area plotted vs. carbon content of the carbon-coated catalyst;

FIGS. 3 and 4 shows 975° F. + conversion rate constant and Ramsbottom carbon residue (RCR) conversion rate constant plotted vs. catalyst age for the carbon-coated and various comparative catalysts.

DESCRIPTION OF INVENTION

Figure 5:
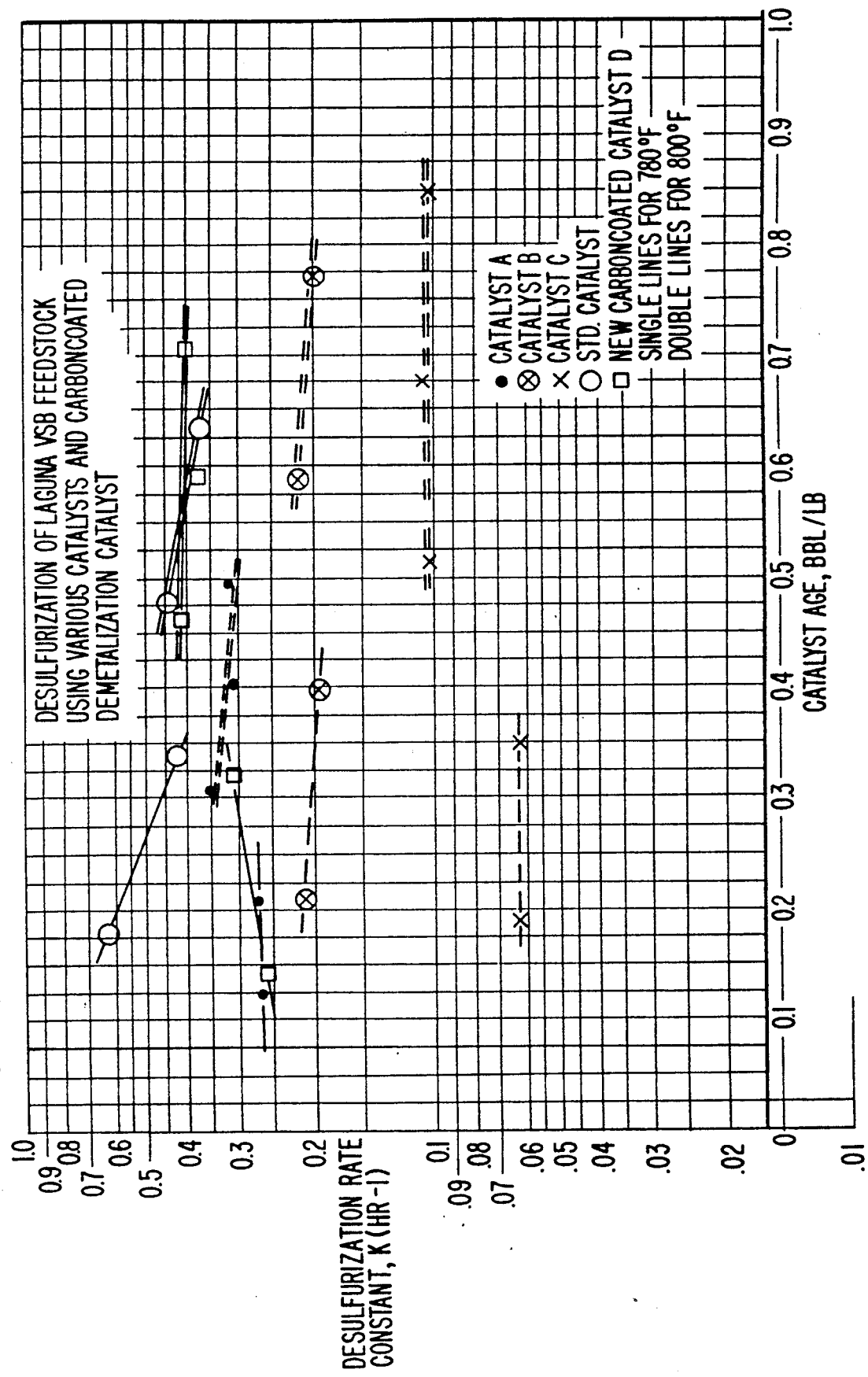
FIG. 5 shows desulfurization rate constant plotted vs. catalyst age for the carbon-coated and various comparative catalysts.

According to the present invention, a metal oxide substrate or support material is carbon coated by using various controlled procedures, including pyrolysis of carbon-containing precursor materials such as alcohols and hydrocarbons and by hydroconversion reactions to produce a composite carbon-coated catalyst having high pore volume, high surface area, and particle strength. Specific useful carbon-coated catalyst production procedures include:

(1) soaking particles of a catalyst substrate material in boiling partially polymerized furfuryl alcohol precursor for 5-30 minutes, followed by pyrolysis of the soaked particles at 800°-1200° F. temperature for 15-180 minutes, then partial oxidation of the carbon-coated catalyst using 0.5-6 V % oxygen-containing gas flow at 650°-850° F. temperature for 15 to 240 minutes, depending upon carbon levels, crush strength, pore volume and pore distribution desired for the catalyst;

(2) pyrolyzing a carbon forming organic vapor, such as 1, 3, butadiene onto a catalyst substrate material at 500°-800° F. temperature; or (3) passing an aromatic petroleum liquid or coal-derived hydrocarbon liquid over a fixed bed of catalyst substrate particles at 700°-800° F. temperature in a hydrogenating atmosphere to carbon coat the catalyst substrate particles, and if desired followed by partial oxidation of the carbon-coated catalyst at 650°-850° F. in a flow of 0.5-6 V % oxygen in nitrogen gas mixture, and/or by a chemical treatment or reduction step.

Metal oxide substrates or support structures which are useful for the carbon-coated catalyst of the present invention include alumina silica, silica-alumina, kieselguhr, magnesia, titania and other similar metal oxides. Also, various compositions of transition promotor metals can be used on or within the carbon layer, including compounds of cobalt, molybdenum, lithium, nickel, tungsten, and zinc and combinations thereof, and including metal compounds Co/Mo, NiS, CoS, MoS, FeS, $FeS_2$, LiH, $MgH_2$, WS and such. Preferred substrate or support materials are alumina, silica, and silica-alumina. Preferred promotor metals are cobalt, molybdenum, nickel, tungsten, and mixtures thereof. By the controlled lay down of a carbon layer and promoter metals on conventional catalyst support particles, such as extrudates or spheres and the selective removal of carbon therefrom, either sequentially or simultaneously, the activity and strength of conventional catalyst are substantially enhanced. Regular or specification catalyst substrates for the ebullated bed reactor applications may also be carbon-coated and enhanced by incorporating pores into the carbon layer with admixed fugitive organic compounds during laydown of polymeric and granular carbon. The catalyst desired pore size distribution can be influenced by selection of the base substrate material, by the carbon precursors used, i.e. aromatic or polymeric material, by metal and fugitive organic additives, and by the conditions of carbon lay down followed by treatment and fixation by pyrolysis and partial oxidation, the combinations being numerous. The metal promoters may be selectively added during carbon lay down, after fixation, or may be added to the substrate material.

Also by this invention, conventional extrudate type catalysts of large average pore size (>150 angstrom units) and high surface area (>150 $M^2$/gram) and activity but which are usually structurally weak can be strengthened considerably to withstand the inter-particle contact which occurs in ebullated, fluidized or pulsed bed reactors, by laydown of a porous carbon protective layer on the extrudate particles. These carbon-coated catalysts having more open pore structures also suffer less loss of pore effective diameter or size and pore volume after coking operation on feedstocks. Such conventional large pore catalysts are not normally applicable to use in ebullated bed catalytic reactors without accompanying severe attrition losses of the catalyst.

A process application for which no satisfactory extrudate catalyst is presently available is the liquid phase methanol and other Fischer-Tropsch reaction processes utilizing fluidized beds. In such process applications, the addition of a carbon layer strengthens the extrudate catalyst material and improves the economics of methanol, alcohol and hydrocarbon production. The catalysts made according to this invention can have the shape of beads, extrudates, spheres or tablets, with extrudates having effective diameter of 0.016 to 0.130 inch usually being preferred.

This invention will be further described by the following examples, which should not be construed as limiting in scope.

EXAMPLE 1

Ebullated bed cold flow modelling and attrition testing was performed with a nominal 1/32 in. diameter extrudate fresh hydrotreating catalyst material, and with a spent catalyst containing 19.8 wt % carbon deposits, in a model reactor with upflowing liquid heptane. The results showed that after 470 hours operation the fresh catalyst particles break down with about 19 W % attrition of the catalyst to form fine particles smaller than 1 mm length, whereas only 2 W % attrition occurred for the used catalyst containing the carbon-coating produced according to this invention. Also, results of catalyst extrudate particle length measurements made after 30 days of attrition testing on fresh and carbon-coated catalysts in an ebullated bed reactor at typical process conditions with liquid superficial upward velocity of 0.1 ft/sec. are shown in Table 1 below.

TABLE 1

| | ATTRITION TESTS ON FRESH AND CARBON-COATED CATALYSTS | | | |
|---|---|---|---|---|
| | Before Attrition Test, W % | | After Attrition Test, W % | |
| Catalyst Length, In | Fresh | Carbon-Coated | Fresh | Carbon-Coated |
| <0.0197 | 0 | 0 | 19.0 | 0 |
| 0.0197-0.039 | 0.62 | 0 | 1.15 | 0 |
| 0.039-0.063 | 1.84 | 8.9 | 5.08 | 12.27 |
| 0.063-0.098 | 19.51 | 37.3 | 24.49 | 62.20 |
| 0.098-0.250 | 78.03 | 51.2 | 50.28 | 25.53 |
| 0.250-0.394 | 0 | 2.6 | 0 | 0 |
| | 100.0 | 100.0 | 100.0 | 100.0 |
| Catalyst Crush Strength, lb/mm | 1.9 | 2.0 | 1.6 | 1.92 |

From the Table 1 results, it is seen that clear attrition resistance and particle strength advantages exists for the carbon-coated catalyst extrudates, in that no detectable breakdown of particles to undesired fines length of <0.039 inch (1 mm) occurred. However, for the fresh catalyst the fines material smaller than 0.039 inch (1 mm) increased from 0.62 W % to 20.15 W % of the catalyst, or increased by 19.53 W %. But for the carbon-coated catalyst no particles were produced smaller than 1 mm length. Thus, it is evident that the carbon-coated catalyst extrudates are stronger and much more resistance to degradation by attrition during ebullated bed reactor testing, than is the fresh uncoated catalyst material.

Comparative crush strengths were also determined for the fresh and carbon-coated catalyst based on a standard crush strength test per ASTM D4179-82, and results are also shown by Table 1. It is noted that during the 30-day attrition tests, the crush strength of the fresh catalyst declined by 16% from 1.9 to 1.6 lb/mm, whereas the carbon-coated catalyst had a slightly higher initial crush strength of 2.0 lb/mm and declined only by 4% to 1.92 lb/mm during the tests. The above results demonstrate that the carbon-coated catalyst is structurally stronger and has less attrition during use than the fresh conventional catalyst.

EXAMPLE 2

Catalytic activity or performance was compared in fixed-bed reactor evaluations on hydroconversion of a hydrocarbon heavy oil feedstock with a fresh standard cobalt-moly promoted HDS-1442B H-Oil(R) catalyst and with a similar catalyst which was carbon-coated and acid-etched, the carbon-coated catalyst containing only 1.05 W % molybdenum promotor and having the same age as the fresh standard catalyst. Operations were conducted on each catalyst at conditions of 810° F. temperature, 2000 psig pressure, and 1.0 liquid hourly space velocity for 120 hours operation. The results are shown in Table 2.

TABLE 2

HYDROCONVERSION PERFORMANCE COMPARISON FOR FRESH AND CARBON-COATED CO—MO CATALYSTS

|  | Fresh Catalyst | Carbon-Coated Catalyst |
|---|---|---|
| Product Fractions, W % | | |
| $C_1$-$C_3$ Gases | 1.6 | 1.4 |
| $C_4$-$C_7$ Liquids | 0.6 | 0.7 |
| $C_4$-400° F. Liquids | 7.5 | 6.4 |
| 400° F.-975° F. Liquid | 51.9 | 52.2 |
| 975° F.+ Material | 44.1 | 45.4 |
| Total | 105.7 | 106.1 |
| Liquid Product | | |
| Gravity, °API | 15.0 | 15.4 |
| Sulfur, W % | 1.8 | 1.6 |
| 975° F.+ Product Fraction | | |
| Gravity, °API | 2.7 | 2.9 |
| Sulfur, W % | 2.5 | 2.0 |
| RCR, W % | 28.5 | 28.8 |

From these results, it is noted that equivalent or better catalytic performance and hydroconversion results were achieved for the carbon-coated catalyst having a significantly lesser percent of molybdenum promoter and the same catalyst age. Thus, the above results clearly demonstrate the concept of a carbon-coated catalyst extrudate material which is stronger and has equivalent or better catalytic activity as compared to a fresh conventional catalyst.

EXAMPLE 3

The Example 1 results have shown that carbon coating of a catalyst improves the attrition resistance and crush strength of the catalyst particles to a significant extent. It has been found that the crush strength of such a catalyst generally depends upon the amount of the carbon deposited on the catalyst and the carbon coating procedure used. FIG. 1 shows that catalyst particle crush strength is improved with increased carbon coating content, when a relatively weak demetallization type catalyst B (HRI 4737) having characteristics shown below in Table 3 is carbon-coated using partially polymerized furfuryl alcohol precursor, followed by pyrolysis of the coated catalyst. FIG. 1 also shows that at least about 10 W % carbon is required on this catalyst for it to have acceptable crush strength of $\geq 1.5$ lb/mm needed for fluidized bed reactor operations with minimal catalyst attrition, and that a carbon content exceeding about 40 W % is usually unnecessary for the catalyst.

FIG. 2 shows how the total pore volume and surface area characteristics of the carbon-coated catalyst B (HRI 4737) each declined with increased carbon coating on the catalyst. It is noted that as the catalyst carbon coating is increased to about 30 W % or more, both the pore volume and surface area of the catalyst are decreased appreciably. For example, for 20 W % carbon content on the catalyst, the pore volume is 0.68 cc/gm, or only 70% of that for the original substrate, and surface area is 160 $M^2$/gm or 55% of the original area. Such decrease is dependent on the type carbon layer which is layed down on the catalyst, as amorphous type carbon coatings tend to appreciably block pores, whereas filamentary and granular carbon deposition blocks the pores to a lesser extent.

Additional experiments were conducted by coating the catalyst B (HRI 4737) substrate with various precursor materials, as shown in Table 4 below. It is noted that the catalyst crush strength is improved most by use of polymerized furfural alcohol (PFL) precursor material, and was improved least by butadiene and polyacrylonitrile precursors.

EXAMPLE 4

Fixed bed catalytic hydroconversion operations were conducted on a Venezuelan Laguna vacuum still bottoms petroleum feedstock at reaction conditions of 780°-800° F. temperature, 2250 psig $H_2$ partial pressure, and 0.6 liquid hourly spaced velocity (LHSV) to compare the activities of a demetallization catalyst A (HRI 4813), a 1.8 W % Mo-impregnated demetallization catalyst B (HRI 4737), standard co-moly HD5-1442B demetallization catalyst C (HRI 4876), and carbon-coated catalyst B designated as catalyst D. Chemical and physical properties of these catalyst are presented in Table 3.

It is noted that pore volume and surface area properties of the carbon-coated catalyst D (carbon-coated HRI 4737) are somewhat similar to those of catalyst A (HRI 4813). The carbon-coated catalyst D has acceptable crush strength of 2.0 lb/mm, equal to that for the conventional standard catalyst HDS 1442B, whereas the uncoated catalyst B (HRI 4737) has extremely low crush strength of only 0.93 lb/mm.

The hydroprocessing operations were conducted on the Venezuela Laguna VSB feedstock using these four catalysts at conditions of 780°-800° F. temperature, 2250 psig hydrogen partial pressure, and 0.6 liquid hourly space velocity for catalyst age between 0.3 and 0.95

TABLE 3

CATALYST INSPECTIONS

| | PRESENT STD. CATALYST HDS 1442B | DEMET. CATALYST A HRI 4813 | DEMET. CATALYST B HRI 4737 | DEMET. CATALYST C HRI 4876 | CARBON-COATED CATALYST D |
|---|---|---|---|---|---|
| Run Number | 115-1596 | 115-1594 | 115-1597 | 115-1595 | 185-408 |
| Chemical Analysis, W % | | | | | |
| Molybdenum | 8.77 | 1.89 | 1.05 | 0.37 | 1.84 on carbon |
| Nickel | | | | 0.54 | |
| Cobalt | 1.87 | | | | |
| Substrate | Alumina Extrudate | Alumina Spheres | Alumina Extrudates | Silica Spheres | Carbon-Coated Alumina |
| Amount of Active Metal in Reactor, gm | 10.84 | 3.01 | 0.83 | 0.83 | 3.02 |
| Physical Properties | | | | | |
| Crush Strength, lb/mm | 2.0 | | 0.93 | | 2.0 |
| Attrition Loss, W % (7 hour test) | 2.66 | 3.0 | 1.29 | | |
| Compacted Bulk Density, gm,cc | 0.56 | 0.874 | 0.436 | 0.5 | |
| Oil Penetration, % Dia. | 92.6 | | 29.1 | | |
| Pore Volume, cc/gm | 0.771 | 0.385 | 0.974 | 0.866 | 0.40 |
| Surface Area, $m^2/gm$ | 387 | 172 | 255 | 82 | 112 |
| Pore Size Distribution, cc/gm | | | | | |
| >30 A° dia. | 0.764 | 0.385 | 0.974 | 0.866 | |
| >250 A° dia. | 0.238 | 0.200 | 0.307 | 0.847 | |
| >500 A° dia. | 0.214 | 0.185 | 0.217 | 0.634 | |
| >1500 A° dia. | 0.17 | 0.17 | 0.052 | 0.003 | |
| >4000 A° dia. | 0.039 | 0.085 | 0.033 | 0.000 | |
| Pore Size Distribution, % | | | | | |
| 30-50 A dia. | 18.0 | 29.9 | 0.5 | 0.6 | |
| 50-100 A dia. | 38.7 | 14.3 | 7.3 | 0.6 | |
| 100-250 A dia. | 12.2 | 3.9 | 60.6 | 1.0 | |
| 250-600 A dia. | 3.8 | 5.2 | 11.6 | 79.6 | |
| 600-1500 A dia. | 5.1 | 3.6 | 14.6 | 17.7 | |
| 1500-4000 A dia. | 17.1 | 22.0 | 2.0 | 0.5 | |
| >4000 A dia. | 5.1 | 21.1 | 3.4 | 0. | | bbl feed/lb catalyst. The resulting performance characteristics of these three catalysts are compared in FIGS. 3-5, which show 975° F. + conversion rate constant K in FIG. 3, Ramsbottom carbon residue (RCR) conversion rate constant K in FIG. 4, and desulfurization constant in FIG. 5, all plotted vs Catalyst age. It is seen that for the carbon-coated catalyst D the conversion rate constants are generally increased with increasing catalyst age, while for other catalysts, A, B, C and these conversion constants were either decreased or were at lower levels. Thus, these data indicate that increased useful catalyst age is achieved for the carbon-coated catalyst materials without loss of catalytic performances.

TABLE 4

CARBON COATING HRI 4737 DEMET. CATALYST USING DIFFERENT CARBON PRECURSORS

| CATALYST CARBON COATING PRECURSOR | CARBONACEOUS MATTER ON CATALYST, W % | CATALYST PARTICLE CRUSH STRENGTH LB/MM |
|---|---|---|
| None | — | 0.9 |
| Partially polymerized furfuryl alcohol | 15.0 | 2.0 |
| 77 W % polymerized furfural alcohol (PFL) from coal liquefaction in toluene | 40-55 | 1.5-2.4 |
| Laguna vacuum bottoms in fixed bed reactor Run 185-344 | 28 | 2.4 |
| Polyacrylonitrile in DMF | 14.7 | 0.9 |
| Butadiene | 13.3 | 1.0 |

FIG. 5 also shows desulfurization rate constant plotted vs catalyst age. It is noted that the carbon coated catalyst D has desulfurization activity superior to the activity of regular catalysts, and had low deactivation rates. The carbon-coated catalyst does not show any indication of deactivation at increased catalyst age up to about 0.8 bbl/lb, whereas the other catalysts either deactivated rapidly and/or had lower desulfurization rates. The low deactivation rate of the carbon coated catalyst may be attributed to low carbon deposition during its reaction usage.

Although this invention has been described broadly and in terms of certain preferred embodiments thereof, it will be understood that modifications and variations of the catalyst material and method for producing it can be made and that some features can be used without others all within the spirit and scope of the invention, which is defined by the following claims.

We claim:

1. An improved composite supported carbon-coated catalyst material for use in catalytic reaction processes, said catalyst comprising:
    (a) a particulate support material selected from the group consisting of alumina, silica, silica-alumina, magnesia, and titania and mixtures thereof;
    (b) a porous carbon layer provided on said support material, said carbon layer being 5-40 wt. % of the composite catalyst and being treated by partial oxidation with oxygen in an inert atmospheric gas so as to increase pore volume and provide 0.3-1.0 cc/gm total pore volume, surface area of 80-600 $M^2/gm$ and increased particle crush strength at least about 1.5 lb/mm; and (c) at least one promoter metal or metal compound selectively added to said support material or carbon layer, said promoter being 0.5-10 wt. % of the composite catalyst, whereby a composite carbon-coated catalyst material is provided having high porosity and increased particle strength characteristics.

2. A catalyst material according to claim 1, wherein said carbon layer has total pore volume of 0.4 to 0.9 cc/gm.

3. A catalyst material according to claim 1, wherein the surface area is 100-500 $M^2$/gm.

4. A catalyst material according to claim 1, wherein the particle crush strength is 1.5-5.0 lb/mm length.

5. A catalyst material according to claim 1, wherein particle attrition loss does not exceed 3.5 W % after 7 hour tumble test at 40 rpm.

6. A catalyst material according to claim 1, wherein said carbon layer is treated to increase pore volume by partial oxidation using 0.5-6 vol. % oxygen in an inert atmospheric gas at 650°-850° F. temperature for 1-300 minutes.

7. A catalyst material according to claim 1, wherein said promoter metal or compound provided for said carbon layer is selected from the group consisting of cobalt, chromium, iron, molybdenum, nickel, titania, tungsten, vanadium, zinc and combinations thereof.

8. A catalyst material according to claim 1, wherein the catalyst is in the form of extrudates or spheres having an effective diameter of 0.016-0.130 inch.

9. A composite supported carbon-coated catalyst material for use in catalytic reaction processes, said catalyst comprising:
(a) a particulate support material selected from the group consisting of alumina, silica, silica-alumina, magnesia, and titania and mixtures thereof;
(b) a porous carbon layer provided on said support material, said carbon layer being 10-30 wt. % of the composite catalyst and being treated by partial oxidation using 0.5-6 vol. % oxygen in an inert atmospheric gas at 650°-850° F. temperature for 1-300 minutes, so as to provide total pore volume of 0.4-0.9 cc/gm, surface area of 100-500 $M^2$/gm, and increased catalyst particle crush strength of 1.8-3.5 lb/mm; and
(c) at least one promoter metal or metal compound selected from the group consisting of cobalt, chromium, iron, molybdenum, nickel, titania, tungsten, vanadium, zinc, and combinations thereof selectively added to said support material or carbon layer, said promoter metal being 0.5-10 wt. % of the composite catalyst, whereby a composite carbon coated catalyst material is provided having high porosity and increased particle strength characteristics.

10. A method for producing a composite supported carbon-coated catalyst material, said method comprising:
(a) providing a particulate support material selected from the group consisting of alumina, silica, silica-alumina, magnesia, titania and mixtures thereof;
(b) providing a carbon-containing precursor material layer on said support material, said precursor layer being sufficient to produce after pyrolysis a porous carbon layer on the support consisting of 5-40 wt. % of the composite catalyst; and
(c) treating the porous carbon layer by partial oxidation with oxygen in an inert atmospheric gas to provide increased total pore volume of 0.3-1.0 cc/gm, surface area of 80-600 $M^2$/gm, and increased particle crush strength for the catalyst of at least about 1.5 lb/mm.

11. A method for producing a catalyst material according to claim 10, wherein the carbon layer is treated by partial oxidation using 0.5-6 vol. % oxygen in an inert oxygen-containing atmospheric gas at 650°-850° F. temperature for 1-300 minutes to produce the increased pore volume and surface area characteristics.

12. A method for producing a catalyst material according to claim 10, wherein said porous carbon layer is deposited on the support material by a hydrocracking process utilizing a hydrocarbon feedstock.

13. A method for producing a catalyst material according to claim 10, wherein the carbon layer is provided by soaking the particulate support material in boiling partially polymerized furfuryl alcohol precursor material for 5-30 minutes, followed by pyrolysis of the coated support at 700°-1200° F. temperature to produce carbon deposits, and then treating the coated support by partial oxidation of the carbon coated catalyst at 650°-850° F. for 15-240 minutes to produce the increased pore volume and surface area characteristics.

14. A method for producing a catalyst material according to claim 10, wherein a metal promoter consisting of 0.5-10 wt. % of the composite catalyst is added to the carbon layer.

15. A method for producing a catalyst material according to claim 10, wherein a metal promotor is added to the metal oxide support material prior to the carbon layer step.

16. A method for producing a catalyst material according to claim 10, wherein a metal promoter is added to said support material together with the carbon layer.

17. A method for producing a catalyst material according to claim 10, wherein said porous carbon layer is provided on the catalyst support material in an ebullated bed or a fluidized bed using polyaromatic compound feed material to form a filamentary carbon structure on the support material.

18. A method for producing a catalyst according to claim 14, wherein said metal promotor is selected from the group consisting of oxides or compounds of cobalt, chromium, iron, nickel, molybdenum, titanium, tungsten and mixtures thereof.

19. A method for producing a composite supported carbon-coated catalyst material, said method comprising:
(a) providing a particulate support material selected from the group consisting of alumina, silica, silica-alumina, magnesia, and titania, and mixtures thereof;
(b) providing a carbon precursor material on said support material sufficient to produce by subsequent pyrolization a porous carbon layer thereon consisting of 5-40 wt. % of the catalyst;
(c) pyrolyzing said carbon precursor layer at temperature of 650°-850° F. and partially oxidizing with oxygen in an inert atmospheric gas the carbon layer to provide total pore volume of 0.3-1.0 cc/gm and surface area of 80-600 $M^2$/gm on the catalyst and particle strength of at least about 1.5 lb/mm; and
(d) adding at least one metal promoter to the carbon layer to provide a composite catalyst material having high activity and increased porosity and particle strength characteristics.

* * * * *